UNITED STATES PATENT OFFICE 2,563,705

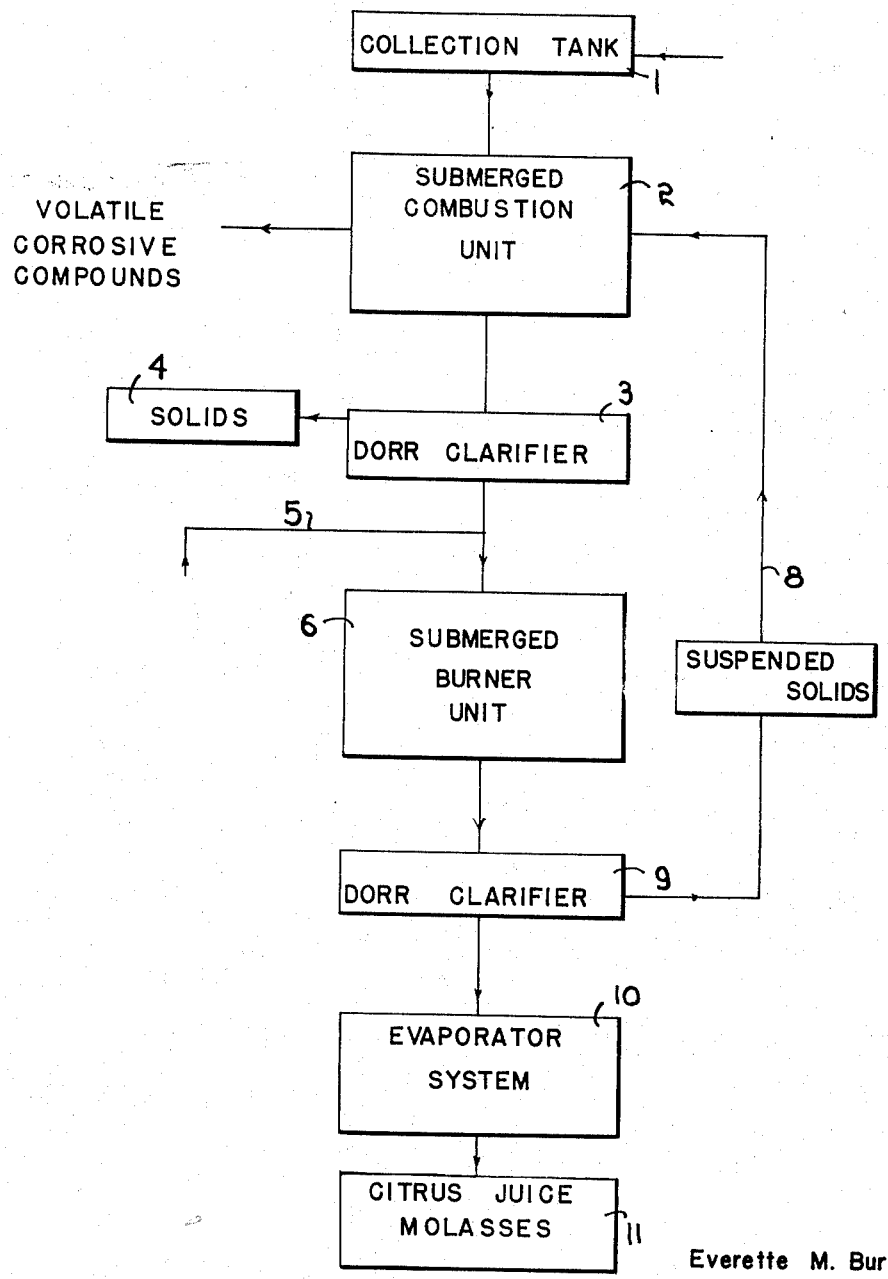

METHOD OF PROCESSING CITRUS JUICES

Everette M. Burdick, Weslaco, and James S. Allen, McAllen, Tex., assignors to Texsun Citrus Exchange, Weslaco, Tex., a corporation Application April 13, 1948, Serial No. 20,815

9 Claims. (Cl. 99—2)

The invention relates to a method and apparatus for producing molasses from citrus juices. Heretofore, the only effective treatment of citrus juices to obtain a molasses has been to concentrate such juices in multiple effect evaporators. However, this procedure has entailed certain difficulties in that the citrus juices contain certain materials such as citrates and pectinates which have inverted solubilities. Due to this inverted solubility, these materials become less and less soluble with increasing temperature, and also a certain amount of protein material is coagulated by heat which separates from the solution. These materials cause severe fouling or scaling of the multiple effect evaporator. Over all costs of operation and maintenance of multiple effect evaporators rapidly increases as scale builds up on the tubes, and at the same time capacity for obtaining molasses from the citrus juices passing through the evaporators falls off rapidly. It has heretofore been necessary, therefore, to operate a plant producing molasses from citrus juices on relatively short cycles of operation from three to five days.

It is then necessary to clean the evaporators in which the citrus juices have been concentrated to molasses because of this excessive scaling. It has also been found that corrosion occurs in the evaporators and especially in the condensate lines thereof. Additionally, marketing, transportation and storage difficulties have arisen from foaming and frothing that occurs, which foaming and frothing is increased during periods of hot weather. While the exact reason or reasons are not known, it appears that the frothing is due to a spontaneous decomposition of suspended material ordinarily left in the final citrus molasses which produces carbon dioxide gas upon storage.

Various attempts have been made to reduce or eliminate the scaling in the multiple effect evaporators; however, none of such attempts have been very successful. It has been proposed to heat the citrus juices in high velocity heat exchangers prior to concentration in an evaporator system. This method affords certain advantageous points; it tends to eliminate sugar losses due to fermentation, to reduce the non-condensable gases and volatile corrosive materials and to produce most of the scale at this point. Some operators make a partial separation of the suspended materials before concentration by settling or centrifugals, but this is very difficult because of the slimy nature of the suspended materials. Other operators prefer to make no separation of suspended materials before evaporation, because of the above mentioned difficulties.

However, scaling or fouling of the evaporator system has not been eliminated by the use of extra heat exchangers; severe scaling still takes place on the tubes of the multiple effect evaporators.

The present invention is directed to a method and apparatus which, for all practical purposes, entirely eliminates scale formation on evaporator tubes, and plant equipment may be run indefinitely without taking the equipment out of operation and cleaning it.

Broadly, the invention contemplates a process and apparatus whereby complete removal of all scale forming materials is effected. This has been accomplished by a special application of submerged combustion wherein the citrus juices are treated under certain desirable but not necessarily limiting conditions to be described. By this procedure, substantially all of the scale forming materials are precipitated from citrus juices in a form which permits their separation by many suitable conventional methods. Thereafter the juices may be concentrated in an evaporator system to produce a molasses of a desired consistency.

An object of the present invention is to produce a treated citrus juice liquor which can be concentrated in a multiple effect evaporator or any other suitable evaporating system without scale formation.

It is another object of the invention to produce a greatly improved citrus molasses by elimination of suspended solids therefrom.

Another object of the invention is to produce a citrus molasses from citrus juices which is more stable than could formerly be produced and to eliminate any frothing and foaming of the citrus juice molasses.

A further object of the invention is to provide a method and apparatus wherein the scale forming materials contained in the citrus juices is removed from such citrus juices whereby the juice can be concentrated in an evaporator system without the formation of a scale in the evaporators.

A still further object of the invention is to precipitate calcium citrate, calcium carbonate and other calcium pectinate compounds in a form readily recoverable from citrus juice liquors.

Yet a further object of the invention is to use submerged combustion to simultaneously concentrate a citrus juice solution while removing scale forming compounds therefrom.

A further object of the invention is to treat citrus juice solutions with an alkaline reagent and to thereafter subject such treated juices to a process to eliminate suspended solids and other compounds therein formed with the alkaline treating reagent.

Other and further objects and advantages of the invention will become more readily apparent from a consideration of the following descriptions and drawing in which a schematic flow diagram of the preferred embodiment of the invention is shown.

A quantity of lime or other suitable alkaline reagent is added to a citrus juice solution in the solution tank 1. It is desirable to add enough lime or alkaline reagent to form compounds with the pectins and the citrates contained in the citrus solution; an excess of alkaline reagent may be added and, if desired, enough lime may be added to adjust the negative logarithm of the hydrogen ion concentration to 10. While this concentration may be varied so that the negative logarithm of the hydrogen ion is between 7 and 10, it has been found that best results are obtained, and a more efficient separation of the pectins from the citrus juice solution will occur when the pH of the citrus juice solution is adjusted to approximately 10.

From the collection tank 1 the citrus solution is passed to a submerged combustion unit 2. This submerged combustion chamber may be of any suitable configuration and is preferably a substantially vertically arranged cone-shaped tank into which is secured a pipe which has a combustion chamber arranged thereon. Oxygen or air and a suitable fuel to be burned are injected into this pipe and combustion effected in the combustion chamber. Any suitable fuel, such as natural gas or the like, may be employed in practicing the invention.

The liquid level within the submerged combustion unit 2 is maintained at a level so that the combustion chamber is substantially lower than such liquid level; therefore, as the fuel burns within the combustion chamber, products of combustion will be evolved into the surrounding liquid. The most important constituent of such product of combustion will be carbon dioxide gas; and the evolution of this gas not only serves to agitate the citrus juice solution, but it will also combine with any excess lime which was injected into the citrus juice solution, in the collection tank 1, to form a precipitate of calcium carbonate. The temperature is maintained in the submerged combustion unit and is dependent upon several factors. However, it has been found most advantageous to hold the citrus juice solution at a temperature from 175 to 190° F. for approximately twenty to thirty minutes in order to produce a precipitate that can be handled by any suitable means for separating solids from liquids. As previously mentioned, the scale forming compounds in the evaporators are believed due to the formation of various soluble compounds such as citrates and pectinates which have inverted solubilities. It has been found that when the combustion chamber is operated at this temperature for this length of time, the calcium citrate and calcium pectinate will form precipitates and separate from the citrus solution. Additionally, suspended organic matter in the citrus juice solution that might tend to form a scale in the evaporators is trapped by the other precipitates and falls down therewith.

The operation in the submerged combustion chamber may either be carried out in batch or continuous procedure, and the feed to such unit may be adjusted so that it will be subjected to the treatment within the combustion chamber for a period of from twenty to thirty minutes. Volatile corrosive compounds will be ejected from the submerged combustion chamber 2 along with water which has been evaporated from the solution. The heated citrus juice solution and precipitate contained therein is then passed to a clarification unit 3. This unit may be of any well-known type, such a settling tank, filter or centrifuge, and we have found that a Dorr type thickener or clarifier is suitable. The precipitates, such as calcium citrate, calcium pectinate and calcium carbonate, are passed to a solids collection unit 4. The solution or effluent obtained from the clarification unit 3 is then subjected to a second combustion chamber 6. If desired, another charge of lime may be injected through the line 5 into the solution before it passes into the second submerged combustion chamber. The second chamber may be disposed with in some cases; however, it has been found that such second chamber serves to remove any additional traces of scale-forming compounds contained therein. The second submerged chamber is similar to the first combustion chamber above described, and the solution is elevated to a temperature from 175 to 190° F. for a period of from twenty to thirty minutes.

The solution from the second submerged combustion chamber 6 is passed to a second clarifier 9 which removes any precipitates therefrom. These precipitates may be passed through the line 8 and reinjected into the first submerged combustion chamber, if desired. The clarified solution or effluent obtained from the clarifier 6 can then be passed to an evaporator system 10 in which it may be concentrated to any desirable consistency with substantially no formation of scale forming materials or compounds. The final citrus juice molasses product is ejected from the evaporator system 10 and can be stored at 11 for an indefinite period until it is placed in commerce.

As previously mentioned, while the temperature within the submerged combustion unit may be varied, it has been found that calcium citrate comprises approximately 75 per cent of the precipitate formed in such combustion chambers and that this compound readily forms at temperatures of about 185° F. The precipitate or scale first forming is amorphous and slimy in nature, but it gradually becomes more and more crystalline or grandular when held at this temperature or higher. Formation of a precipitate that will settle or filter with ease is best obtained by holding the citrus solution in the combustion chamber at least ten minutes. Somewhat shorter times are necessary at higher temperatures, while longer times are required at lower temperatures. While it has been pointed out in the invention that the suspended solids, obtained from the second clarifier, are reinjected into the first submerged combustion chamber 2, such precipitates can be added, if desired, into the collection tank 1 or the second submerged combustion chamber 6. It has been found that more desirable results are obtained with the invention when a second charge of lime is added after the first combustion step, so that any remaining scale-forming compounds will be removed in the submerged burner 4 before the citrus solution is passed to the evaporator system.

Broadly, the invention contemplates a method and apparatus for producing an edible stockfeed molasses from citrus juice.

What is claimed is:

1. A method of processing citrus juice solutions comprising the steps of, adding a lime reagent to the juices in a quantity sufficient to render the solution definitely alkaline, heating the alkaline solution with an open flame submerged in the solution to precipitate the calcium citrates and pectinates and suspended solids present in the alkaline juice solution, separating such precipitates from the juice solution, subjecting the juice solution to a second submerged open flame heating and to a second separation to remove residual solids, and evaporating the remaining citrus juice solution to a predetermined point.

2. In the method of producing molasses from citrus juices wherein lime is added to a juice solution in a quantity sufficient to form calcium citrates and pectinates and having an excess of lime remaining in the solution, heating and contacting the juice solution with an open flame submerged therein to precipitate said calcium citrate, calcium pectinate, and the excess lime present in the solution, separating said precipitates from the juice solution, and concentrating said solution to produce a molasses of a desired consistency.

3. A method of producing molasses from a citrus juice solution wherein scale-forming compounds are removed from such solution so that it can be concentrated in an evaporator system without depositing scale-forming compounds therein thereby reducing the efficiency of such system comprising, adding a quantity of lime to said juice solution in an amount sufficient to produce a definitely alkaline juice solution, heating and contacting said solution with an open flame submerged therein to precipitate compounds formed with the lime and the excess lime in said solution, separating said precipitates from said juice solution, heating the solution a second time to precipitate any residual traces of solids, separating such residual solids from the solution and thereafter concentrating the solution in an evaporator system to a predetermined consistency.

4. A method of producing molasses from a citrus juice solution wherein scale-forming compounds are removed from such solution so that it can be concentrated in an evaporator system without depositing scale-forming compounds therein thereby reducing the efficiency of such system comprising, adding a quantity of lime to said juice solution in an amount sufficient to produce a definitely alkaline juice solution, heating said solution with an open flame submerged in the solution to precipitate compounds formed with the lime and the excess lime in said solution, separating said precipitates from said juice solution, and concentrating said solution in an evaporator system to a predetermined consistency.

5. In the processing of citrus juices to obtain a molasses in which process an excess alkaline reagent is added to the juice solution to form compounds with pectins and citric acid which have inverted solubilities, heating the solution and alkaline reagent with an open flame submerged in the solution to precipitate said compounds and the excess of said alkaline reagent, and separating said precipitates from the solution.

6. A method of preparing molasses from a citrus juice solution comprising the steps of, adding lime to said solution until the pH thereof approximates 8 to 10, heating said solution with an open flame submerged in the solution to a temperature of approximately 175° to 190° for a period of twenty to thirty minutes to precipitate compounds formed with the lime and the excess lime in said solution, clarifying said heated liquid to remove any solids therefrom, and concentrating said liquid to a predetermined consistency to form molasses.

7. In the method of processing citrus juices wherein an alkaline reagent is added to the juice solution to aid in removing undesired matter present in the solution, the step of heating the solution with a flame submerged in a solution to precipitate the matter present in the solution.

8. In the method of processing citrus juices wherein an alkaline reagent is added to the juice solution to aid in removing undesired matter present in the solution, the step of subjecting the solution to an open flame heating submerged therein to precipitate the matter from the solution, and separating such precipitate from the solution.

9. In the processing of citrus juices to obtain a molasses in which process an alkaline reagent is added to the juice solution to aid in removing undesired matter present in the solution, the step of subjecting the solution to a heating wherein the products of combustion of such heating contact the solution to precipitate the matter.

EVERETTE M. BURDICK.
JAMES S. ALLEN.

REFERENCES CITED

The following references are of record in the file of this patent:

UNITED STATES PATENTS

| Number | Name | Date |
|---|---|---|
| 1,141,458 | Gore | June 1, 1915 |
| 2,362,014 | Lissauer et al. | Nov. 7, 1944 |
| 2,421,376 | Erickson et al. | June 3, 1947 |